(12) United States Patent
Chen

(10) Patent No.: US 8,359,713 B1
(45) Date of Patent: Jan. 29, 2013

(54) BIKE AUXILIARY HANDLE FIXING STRUCTURE

(75) Inventor: Ming-Chou Chen, Taichung (TW)

(73) Assignee: Sienna Group Corporation, Taichung (TW)

( * ) Notice: Subject to any disclaimer, the term of this patent is extended or adjusted under 35 U.S.C. 154(b) by 0 days.

(21) Appl. No.: 13/298,405

(22) Filed: Nov. 17, 2011

(51) Int. Cl.
*B25G 1/00* (2006.01)

(52) U.S. Cl. ...... 16/426; 16/421; 16/DIG. 24; 74/551.8; 74/551.9

(58) Field of Classification Search ............... 16/426, 16/421, 422, 110.1, DIG. 24; 294/58; 74/551.1, 74/551.8, 551.9; 403/374.3
See application file for complete search history.

(56) References Cited

U.S. PATENT DOCUMENTS

| | | | | |
|---|---|---|---|---|
| 5,163,339 | A * | 11/1992 | Giard et al. | 74/551.3 |
| 7,207,237 | B2 * | 4/2007 | Johnson | 74/551.8 |
| 2005/0132839 | A1 * | 6/2005 | Chen | 74/551.8 |
| 2008/0219760 | A1 * | 9/2008 | Wu et al. | 403/322.4 |

FOREIGN PATENT DOCUMENTS

| | | | | |
|---|---|---|---|---|
| CN | 201023605 Y | * | 2/2008 | |
| CN | 201065171 Y | * | 5/2008 | |
| CN | 201186718 Y | * | 1/2009 | |
| CN | 201484604 U | * | 5/2010 | |
| CN | 201665290 U | * | 12/2010 | |
| CN | 202070078 U | * | 12/2011 | |
| TW | 270984 U | * | 7/2005 | |
| TW | 375029 U | * | 3/2010 | |
| TW | 385518 U | * | 8/2010 | |
| TW | M397943 | | 2/2011 | |

* cited by examiner

*Primary Examiner* — William L. Miller
(74) *Attorney, Agent, or Firm* — Jackson IPG PLLC

(57) ABSTRACT

A bike auxiliary handle fixing structure includes a main handle, an auxiliary handle fixing device and locking members. The auxiliary handle fixing device includes an auxiliary handle fixing seat and an auxiliary handle fixing unit. The auxiliary handle fixing unit is hidden in the inner bottom of an auxiliary handle fixing passage in the auxiliary handle fixing seat. The locking members are inserted from the bottom of the main handle and locked to the auxiliary handle fixing seat to secure an auxiliary handle together.

3 Claims, 7 Drawing Sheets

BIKE AUXILIARY HANDLE FIXING STRUCTURE

BACKGROUND OF THE INVENTION

1. Field of the Invention

The present invention relates to a bike auxiliary handle fixing structure which is beautiful and can assist in adjusting the direction of the auxiliary handle.

2. Description of the Prior Art

A conventional bike auxiliary handle fixing device (referring to TW Utility Model Patent No. M397943, titled "COMBINED FIXING SEAT OF BIKE HANDLE AND AUXILAIRYT HANDLE AND PAD SEAT") comprises a main handle with an exposed through hole seat for insertion of an auxiliary handle. The through hole seat has a threaded hole at a circumferential portion for insertion of a bolt to fix the auxiliary handle. The conventional fixing device has the following shortcomings.

1. The exposed structure is unable to lower wind resistance. The conventional bike auxiliary handle fixing device has an exposed configuration, which cannot comply with to the demand of the professional contest because it is unable to lower wind resistance. When it is used to an expensive bike, it will influence the quality of the bike.

2. It is easy to be damaged. When the bike topples down, the conventional bike auxiliary handle fixing device may be damaged due to collision. Though it can be repaired, it may slant and cannot secure the auxiliary handle firmly.

Accordingly, the inventor of the present invention has devoted himself based on his many years of practical experiences to solve these problems.

SUMMARY OF THE INVENTION

The primary object of the present invention is to provide a bike auxiliary handle fixing structure which is beautiful and can assist in adjusting the length of the auxiliary handle.

In order to achieve the aforesaid object, the bike auxiliary handle fixing structure of the present invention comprises a main handle and an auxiliary handle fixing device.

The main handle has a fixing portion on a top thereof and a pair of first threaded holes at front and rear ends of the fixing portion.

The auxiliary handle fixing device is coupled to the fixing portion of the main handle. The auxiliary handle fixing device comprises an auxiliary handle fixing seat and an auxiliary handle fixing unit.

The auxiliary handle fixing seat has an auxiliary handle fixing passage for insertion of an auxiliary handle, a positioning trough at a central inner bottom of the auxiliary handle fixing passage, an insertion hole underneath the positioning trough, and a pair of second threaded holes at front and rear ends of the positioning trough.

The second threaded holes correspond in position to the first threaded holes of the fixing portion of the main handle. The auxiliary handle fixing seat has a connecting portion extending from an outer side thereof for connection of a pedestal which is adapted for rest of the user's elbow.

The auxiliary handle fixing unit comprises a pad and a cushion. The pad has a top surface which has an arc shape. The pad is inserted in the positioning trough at the inner bottom of the auxiliary handle fixing passage. The cushion is located under the pad and inserted in the insertion hole at the inner bottom of the auxiliary handle fixing passage.

Two locking members are inserted through the first threaded holes at the front and rear ends of the fixing portion of the main handle and screwed to the second threaded holes at the front and rear ends of the positioning trough at the inner bottom of the auxiliary handle fixing passage. When locked, the auxiliary handle fixing seat is moved downward, and the pad in the positioning trough at the inner bottom of the auxiliary handle fixing passage extends into the auxiliary handle fixing passage to fixedly secure the auxiliary handle to the auxiliary handle fixing seat.

DETAILED DESCRIPTION OF THE PREFERRED EMBODIMENTS

Embodiments of the present invention will now be described, by way of example only, with reference to the accompanying drawings.

Figure 1:
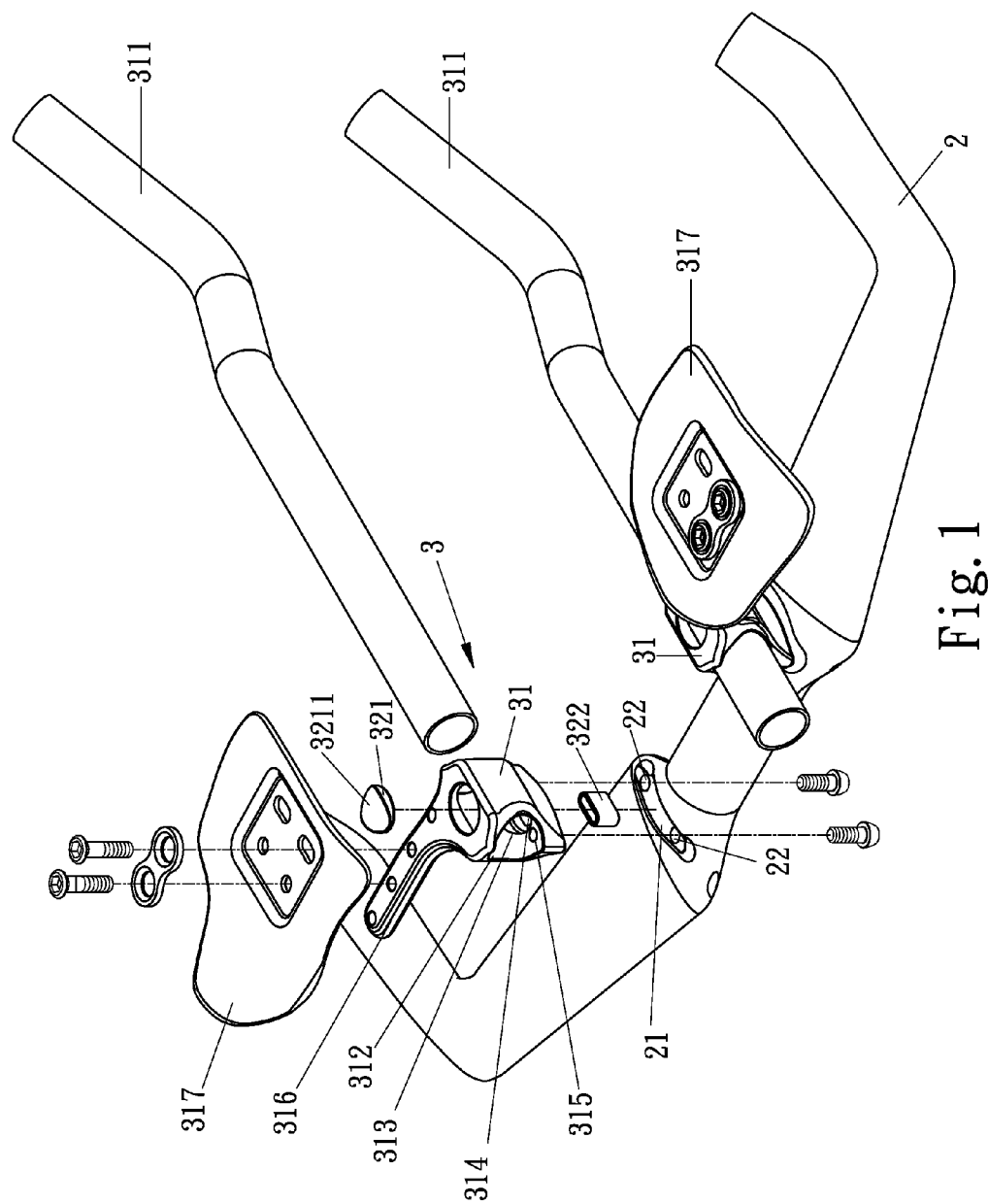
FIG. 1 is an exploded view according to a preferred embodiment of the present invention.
Figure 2:
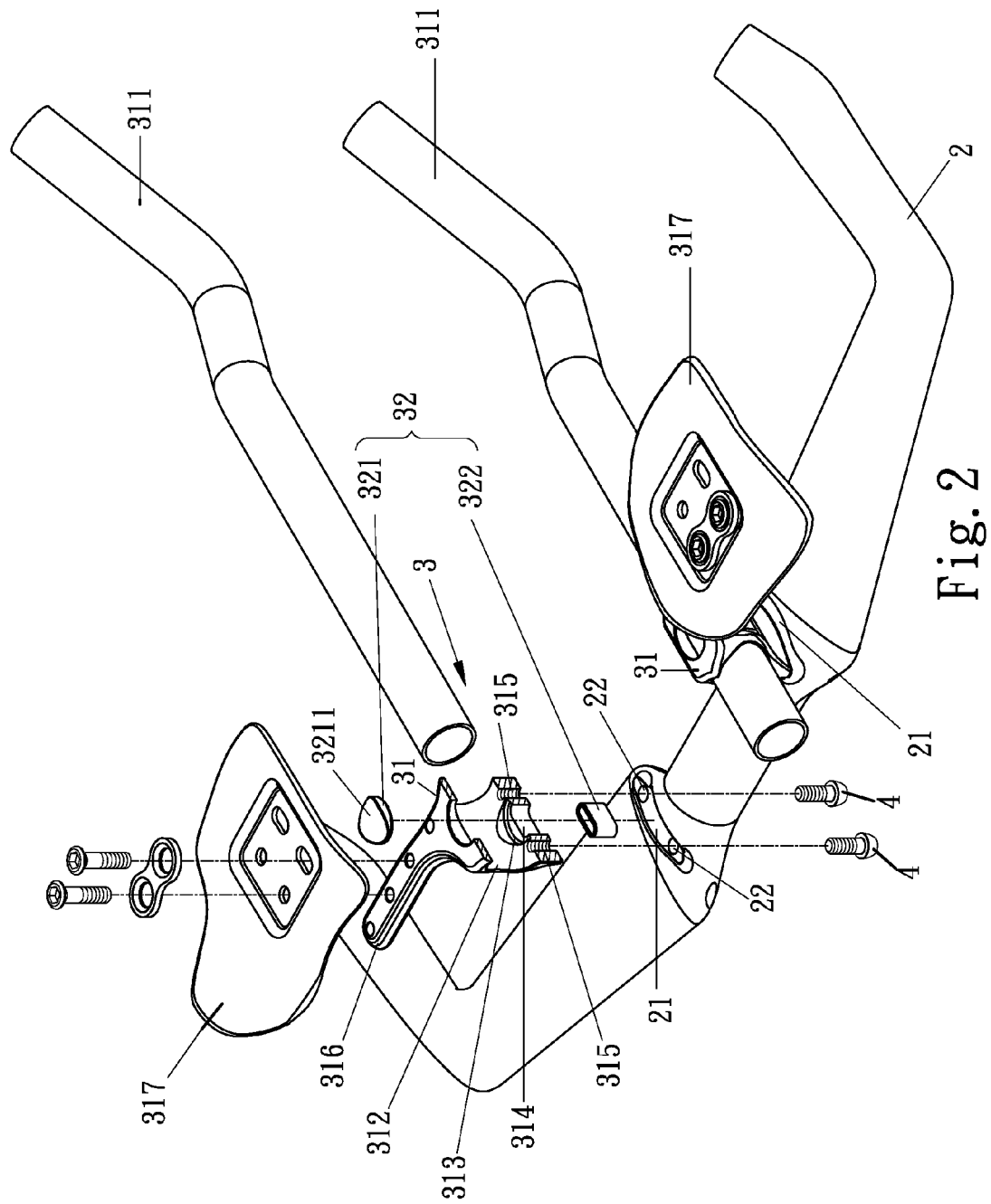
FIG. 2 is a partial sectional view showing the auxiliary handle fixing device according to the preferred embodiment of the present invention.
Figure 3:
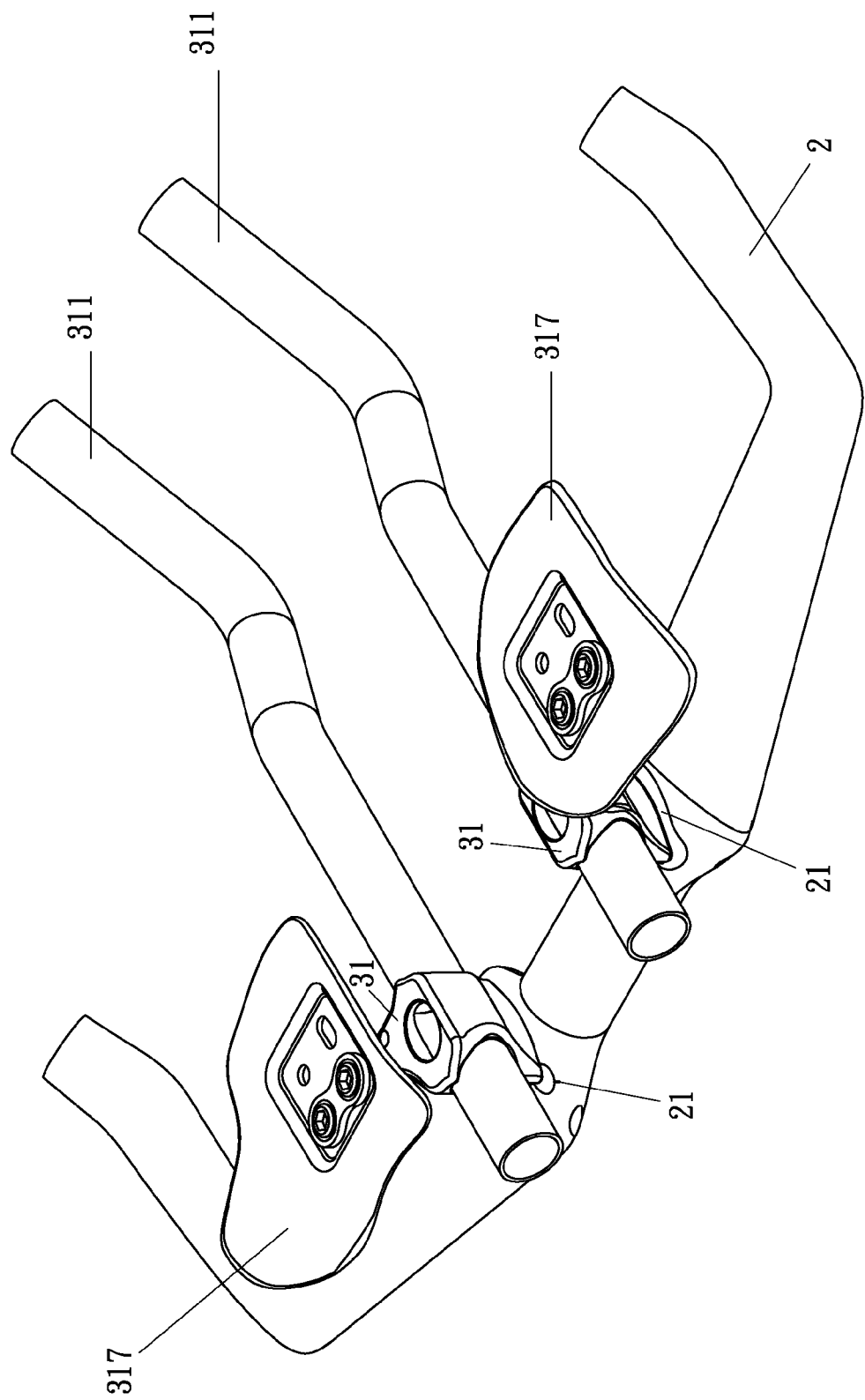
FIG. 3 is a perspective view according to the preferred embodiment of the present invention.
Figure 4:
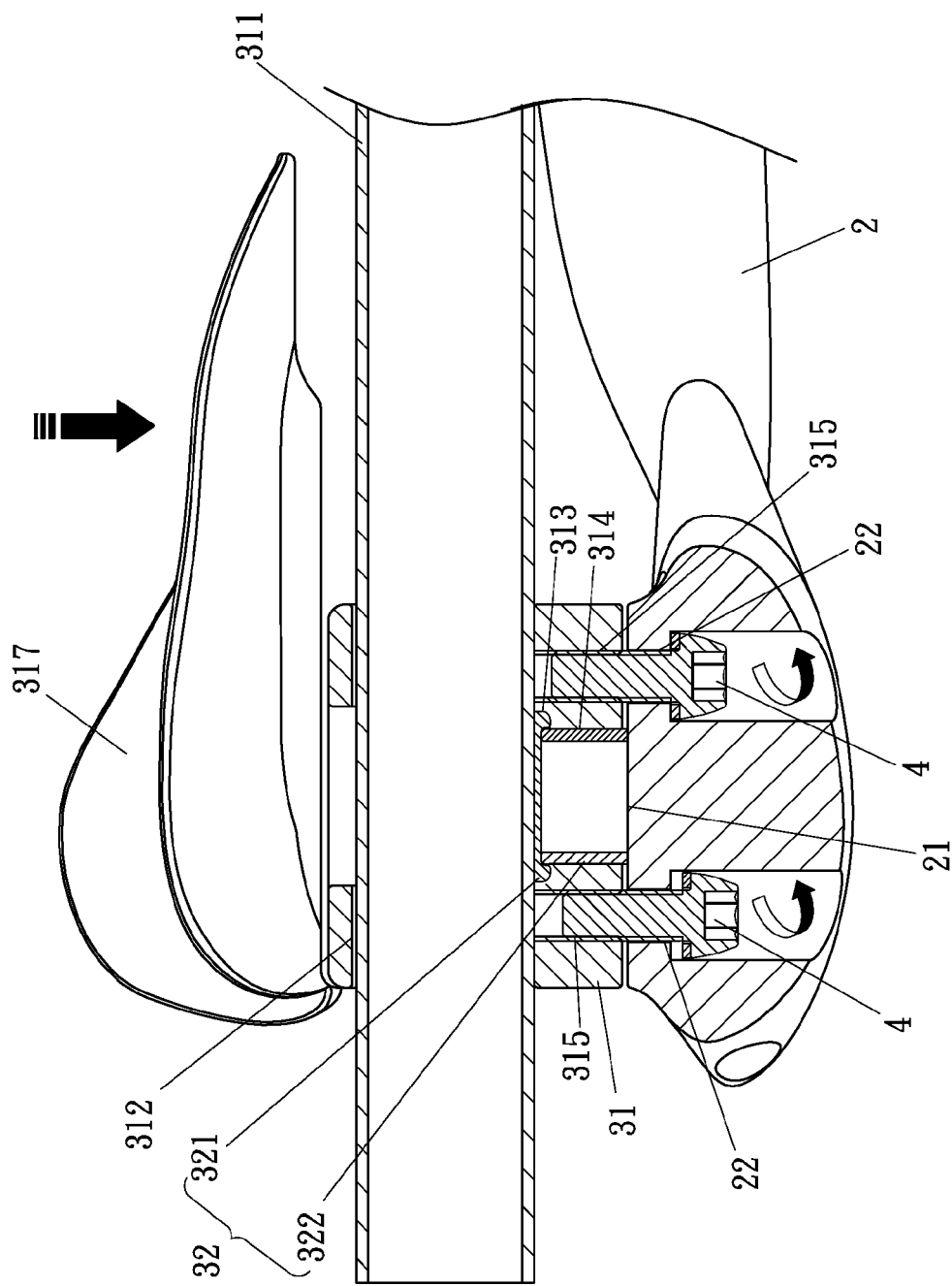
FIG. 4 is a sectional view according to the preferred embodiment of the present invention.
Figure 5:
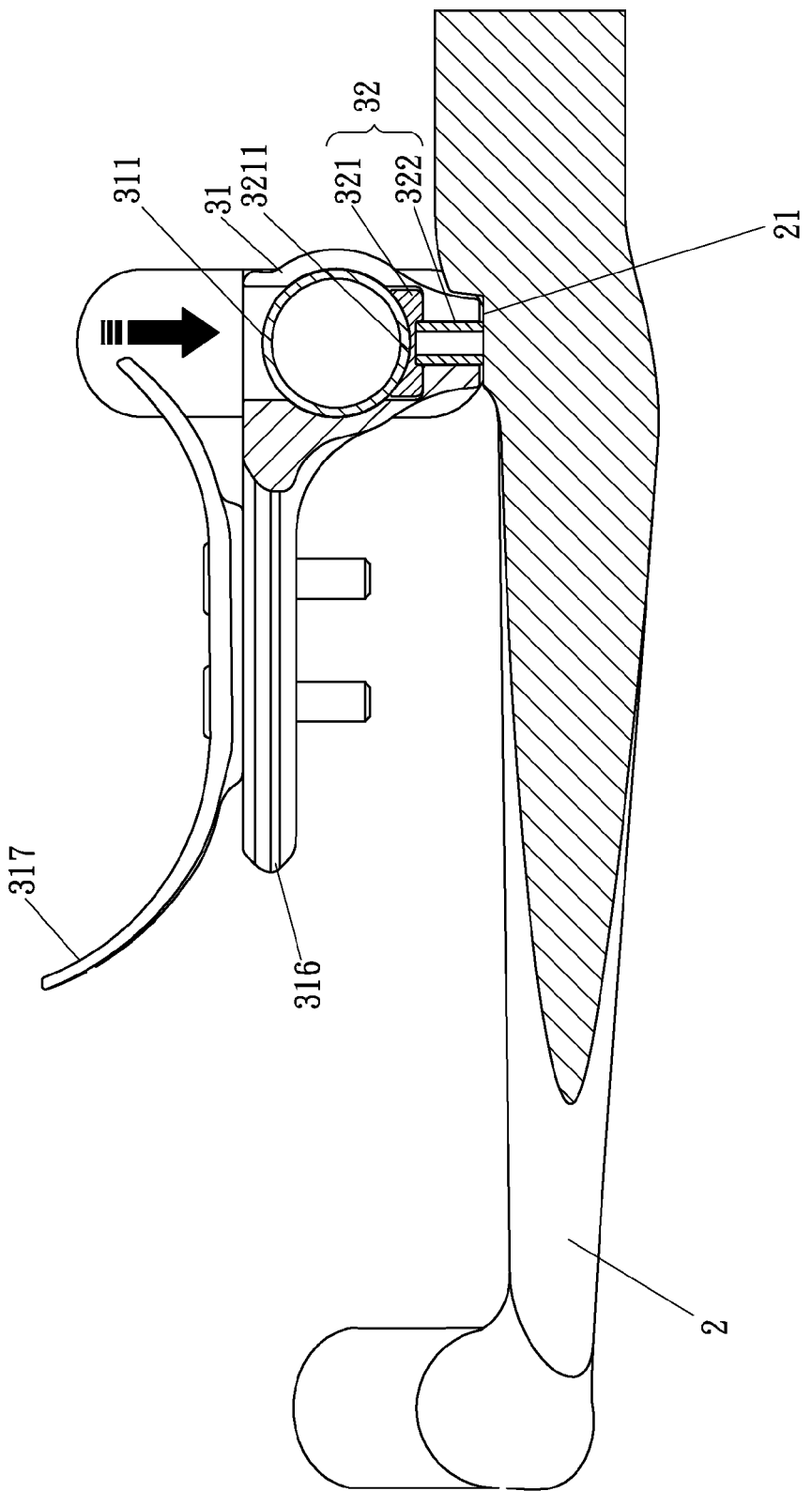
FIG. 5 is another sectional view according to the preferred embodiment of the present invention.
Figure 6:
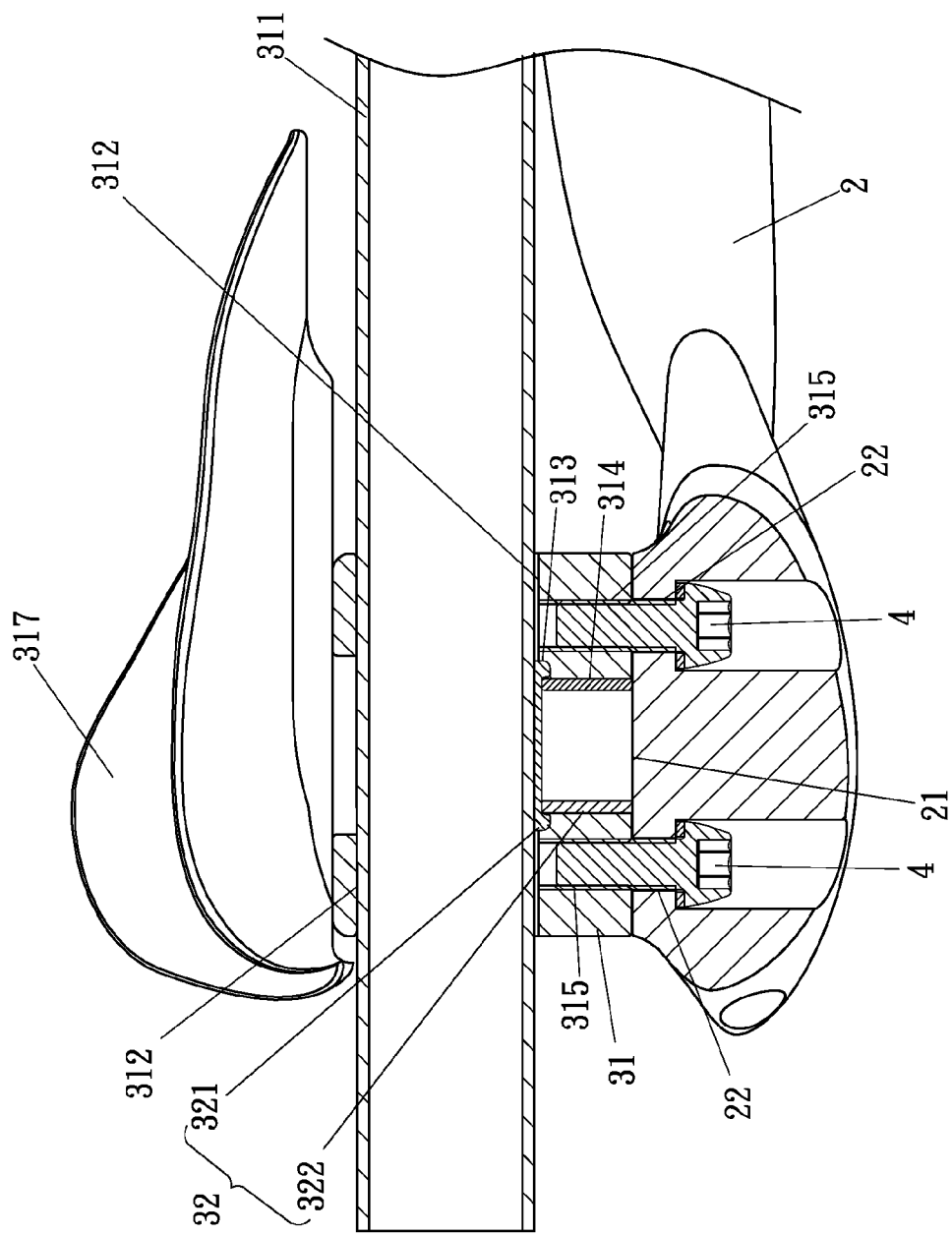
FIG. 6 is a sectional view according to the preferred embodiment of the present invention in a locked state.
Figure 7:
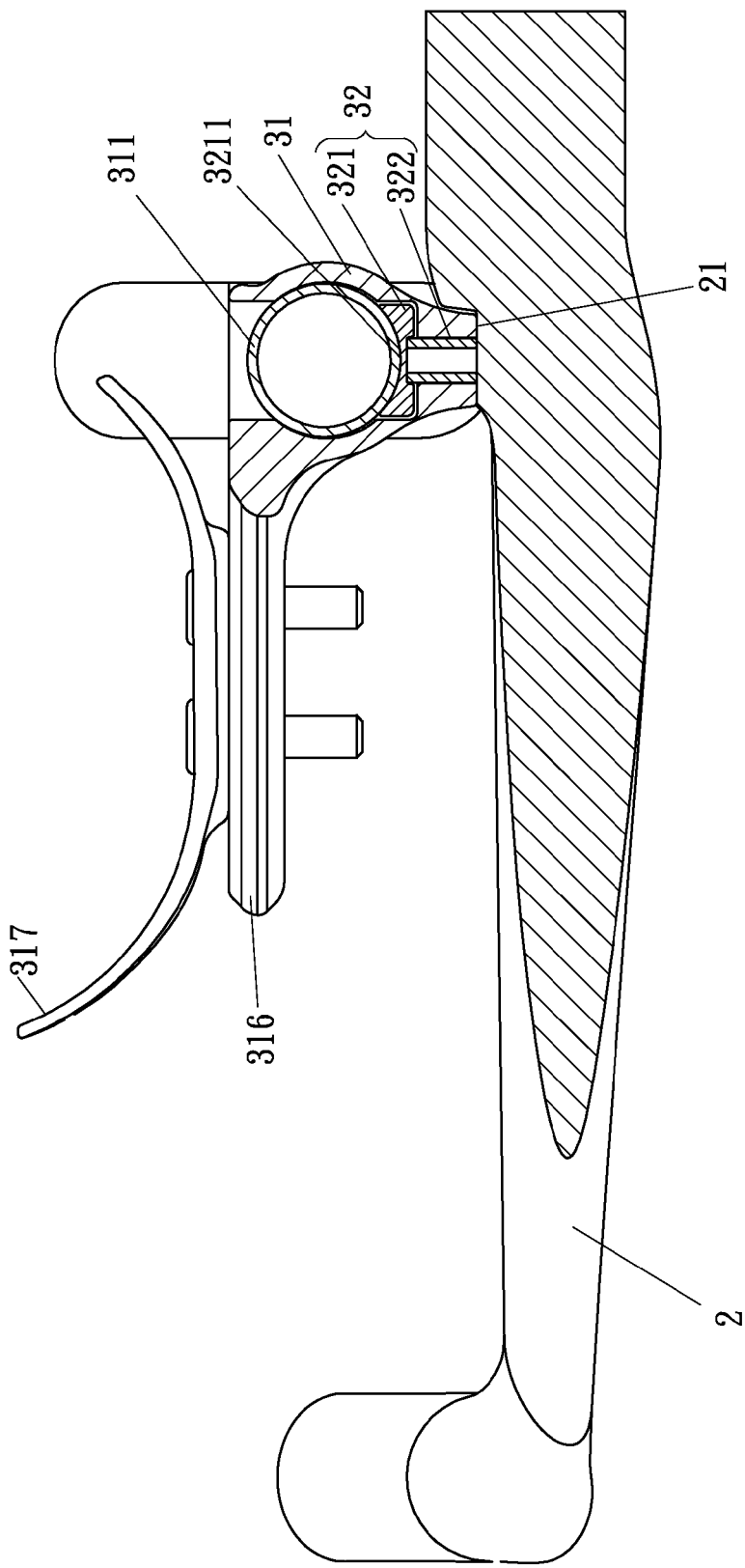
FIG. 7 is another sectional view according to the preferred embodiment of the present invention in a locked state.

Referring to FIG. 1 through FIG. 7, the bike auxiliary handle fixing structure according to a preferred embodiment of the present invention comprises a main handle 2 and an auxiliary handle fixing device 3.

The main handle 2 has a fixing portion 21 on a top thereof and a pair of first threaded holes 22 at front and rear ends of the fixing portion 21.

The auxiliary handle fixing device 3 is coupled to the fixing portion 21 of the main handle 2. The auxiliary handle fixing device 3 comprises an auxiliary handle fixing seat 31 and an auxiliary handle fixing unit 32.

The auxiliary handle fixing seat 31 has an auxiliary handle fixing passage 312 for insertion of an auxiliary handle 311, a positioning trough 313 at a central inner bottom of the auxiliary handle fixing passage 312, an insertion hole 314 underneath the positioning trough 313, and a pair of second threaded holes 315 at front and rear ends of the positioning trough 313. The second threaded holes 315 correspond in position to the first threaded holes 22 of the fixing portion 21 of the main handle 2. The auxiliary handle fixing seat 31 has a connecting portion 316 extending from an outer side thereof for connection of a pedestal 317 which is adapted for rest of the user's elbow.

The auxiliary handle fixing unit 32 comprises a pad 321 and a cushion 322. The pad 321 has a top surface 3211 which has an arc shape. The pad 321 is inserted in the positioning trough 313 at the inner bottom of the auxiliary handle fixing passage 312. The cushion 322 is located under the pad 321 and inserted in the insertion hole 314 at the inner bottom of the auxiliary handle fixing passage 312.

Two locking members 4 are inserted through the first threaded holes 22 at the front and rear ends of the fixing portion 21 of the main handle 2 and screwed to the second threaded holes 315 at the front and rear ends of the positioning trough 313 at the inner bottom of the auxiliary handle fixing passage 312. When locked, the auxiliary handle fixing seat 31 is moved downward, and the pad 321 in the positioning trough 313 at the inner bottom of the auxiliary handle fixing passage 312 extends into the auxiliary handle fixing passage 312 to fixedly secure the auxiliary handle 311 to the auxiliary handle fixing seat.

To assemble the present invention, one end of the cushion 322 is inserted in the insertion hole 314 at the inner bottom of the auxiliary handle passage 312 and the pad 321 is inserted in the positioning trough 313 at the inner bottom of the auxiliary handle passage 312, so that the auxiliary handle fixing unit 32 is hidden in the inner bottom of the auxiliary handle fixing passage 312 of the auxiliary handle fixing seat 31. After that, the auxiliary handle fixing seat 31 is placed on the fixing portion 21 at the top of the main handle 2, and the second threaded holes 315 at the front and rear ends of the positioning trough 313 at the inner bottom of the auxiliary handle fixing passage 312 are aligned with the first threaded holes 22 at the front and rear ends of the fixing portion 21 of the main handle 2. Finally, the two locking members 4 are inserted from the lower ends of the first threaded holes 22 at the front and rear ends of the fixing portion 21 of the main handle 2 to engage with the second threaded holes 315 at the front and rear ends of the positioning trough 313 at the inner bottom of the auxiliary handle fixing passage 312. When locked, the auxiliary handle fixing seat 31 is moved downward, and the pad 321 in the positioning trough 313 at the inner bottom of the auxiliary handle fixing passage 312 extends into the auxiliary handle fixing passage 312 to fixedly secure the auxiliary handle 311 to the auxiliary handle fixing seat. The direction of the auxiliary handle 311 can be adjusted as desired by loosening the two locking members 4. After adjustment, the two locking members 4 are locked again to secure the auxiliary handle 311.

The present invention has the following advantages:

1. The hidden structure is beautiful and enhances its quality. The pad, the cushion and the two locking members of the auxiliary handle fixing unit are all hidden at the inner bottom of the auxiliary handle fixing passage, so that parts won't be exposed to influence its appearance and cause turbulence. The quality of the structure is enhanced and the wind resistance coefficient is reduced.

2. The length of the auxiliary handle can be adjusted with ease. The entire configuration of the auxiliary handle fixing unit is hidden at the inner bottom of the auxiliary handle fixing passage. The user can adjust the direction of the auxiliary handle as desired by loosening the two locking members. After adjustment, the two locking members are locked again to secure the auxiliary handle to provide an easy way for adjustment.

3. The structure won't be damaged easily when the bike topples down. The entire configuration of the auxiliary handle fixing unit is hidden at the inner bottom of the auxiliary handle fixing passage. When the bike topples down, the configuration of the auxiliary handle fixing unit won't be damaged.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A bike auxiliary handle fixing structure, comprising:
   a main handle, the main handle having a fixing portion on a top thereof and a pair of first threaded holes at front and rear ends of the fixing portion;
   an auxiliary handle fixing device coupled to the fixing portion of the main handle, the auxiliary handle fixing device comprising an auxiliary handle fixing seat and an auxiliary handle fixing unit;
   the auxiliary handle fixing seat having an auxiliary handle fixing passage for insertion of an auxiliary handle, a positioning trough at an inner bottom of the auxiliary handle fixing passage, an insertion hole underneath the positioning trough and a pair of second threaded holes at front and rear ends of the positioning trough, the pair of second threaded holes corresponding in position to the pair of first threaded holes of the fixing portion of the main handle;
   the auxiliary handle fixing unit comprising a pad and a cushion, the pad being inserted in the positioning trough at the inner bottom of the auxiliary handle fixing passage, the cushion being located under the pad and inserted in the insertion hole at the inner bottom of the auxiliary handle fixing passage;
   two locking members inserted through the pair of first threaded holes at the front and rear ends of the fixing portion of the main handle and screwed to the pair of second threaded holes at the front and rear ends of the positioning trough at the inner bottom of the auxiliary handle fixing passage, when locked, the auxiliary handle fixing seat being moved downward and the pad in the positioning trough at the inner bottom of the auxiliary handle fixing passage extending into the auxiliary handle fixing passage to fixedly secure the auxiliary handle to the auxiliary handle fixing seat.

2. The bike auxiliary handle fixing structure as claimed in claim 1, wherein the pad has a top surface which has an arc shape.

3. The bike auxiliary handle fixing structure as claimed in claim 1, wherein the auxiliary handle fixing seat has a connecting portion and a pedestal at an outer side thereof.

* * * * *